April 13, 1965    A. E. OGREN    3,178,058
PAINT DISPENSING MACHINE
Filed Sept. 19, 1962    5 Sheets-Sheet 3
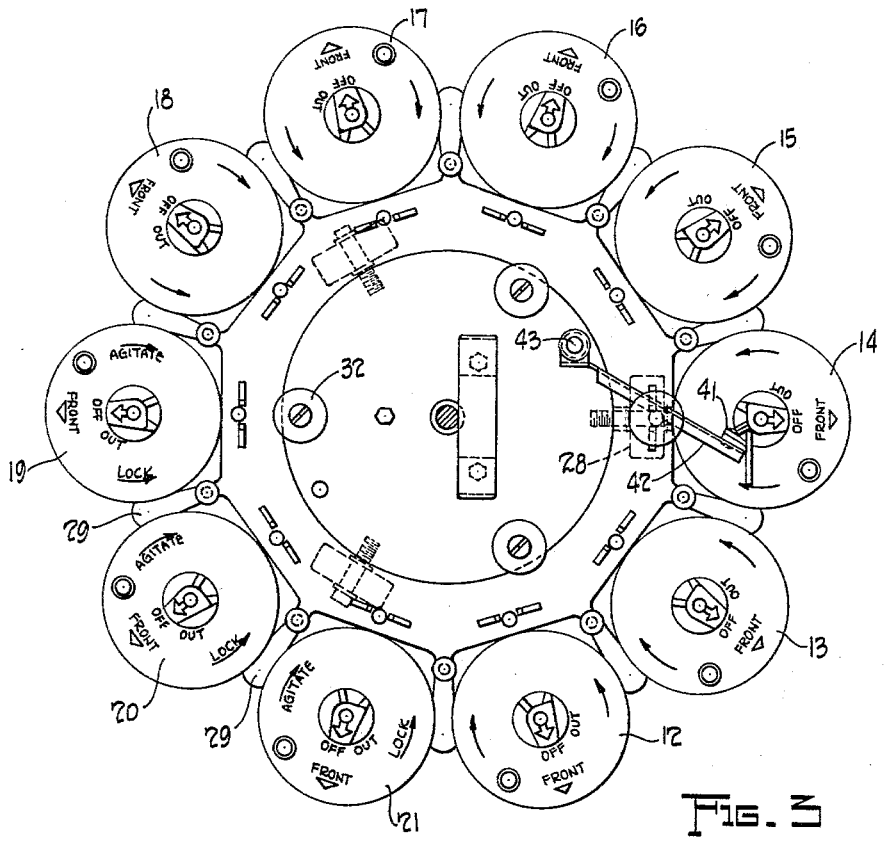
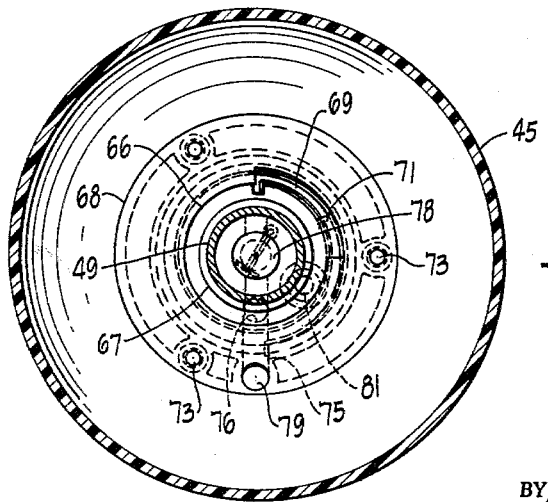
INVENTOR.
AXEL E. OGREN
BY
Schramm, Kramer & Strueger
ATTORNEYS.

INVENTOR.
AXEL E. OGREN
BY Schramm, Kramer & Sturges
ATTORNEYS.

April 13, 1965 A. E. OGREN 3,178,058
PAINT DISPENSING MACHINE
Filed Sept. 19, 1962 5 Sheets-Sheet 5

INVENTOR.
AXEL E. OGREN
BY Schramm, Kramer & Sturges
ATTORNEYS.

Patented Apr. 13, 1965

3,178,058
PAINT DISPENSING MACHINE
Axel E. Ogren, Deshler, Ohio, assignor to The Sherwin-Williams Company, Cleveland, Ohio, a corporation of Ohio
Filed Sept. 19, 1962, Ser. No. 224,746
8 Claims. (Cl. 222—41)

This invention relates to dispensing systems and concerns principally dispensing paint or colorants of different colors or liquids of different properties which are to be mixed or blended.

An object of the invention is to enable measured quantities of different liquids to be discharged.

Still another object of the invention is to cause measured quantities from each of a battery of different liquid containers to be discharged at a predetermined position.

Still another object of the invention is to accomplish the simultaneous metering of a quantity of liquid and the manipulation of a valve for discharging the liquid.

Still another object of the invention is to provide an improved non-sticking and a non-clogging stirrer which may readily be disassembled.

Other and further objects, features and advantages of the invention will become apparent as the description proceeds.

In carrying out the invention in accordance with a preferred form thereof, a support or pedestal is provided having a carrier rotatably mounted thereon. The carrier has a battery of liquid receptacles or reservoirs so arranged that each of the reservoirs may be rotated to a predetermined position, at which a desired quantity of paint, colorant or other liquid may be discharged into a liquid container such as a paint can located in a suitable position with respect to the support and the point at which the paint or other liquid is discharged.

A scale is mounted on the support at the position to which the reservoirs are brought for discharge. Each reservoir contains a centrally located metering device or pump having a piston rod carrying an index adapted to co-operate with a calibrated scale. The index is rotatable so that it may be moved longitudinally for metering the quantity of liquid to be discharged and may be rotated for controlling the intake of liquid from the reservoir to the metering device and the discharge to the liquid receiving container.

A better understanding of the invention will be afforded by the following detailed description considered in conjunction with the accompanying drawing, in which:

FIG. 3 is a plan view of the apparatus of FIG. 1;

FIG. 7 is a view of a section of the apparatus represented as cut by a plane 7—7 indicated in FIG. 4 and as seen looking down, but drawn to a larger scale than FIG. 4;

Like reference characters are utilized throughout the drawing to designate like parts.

Figure 1:
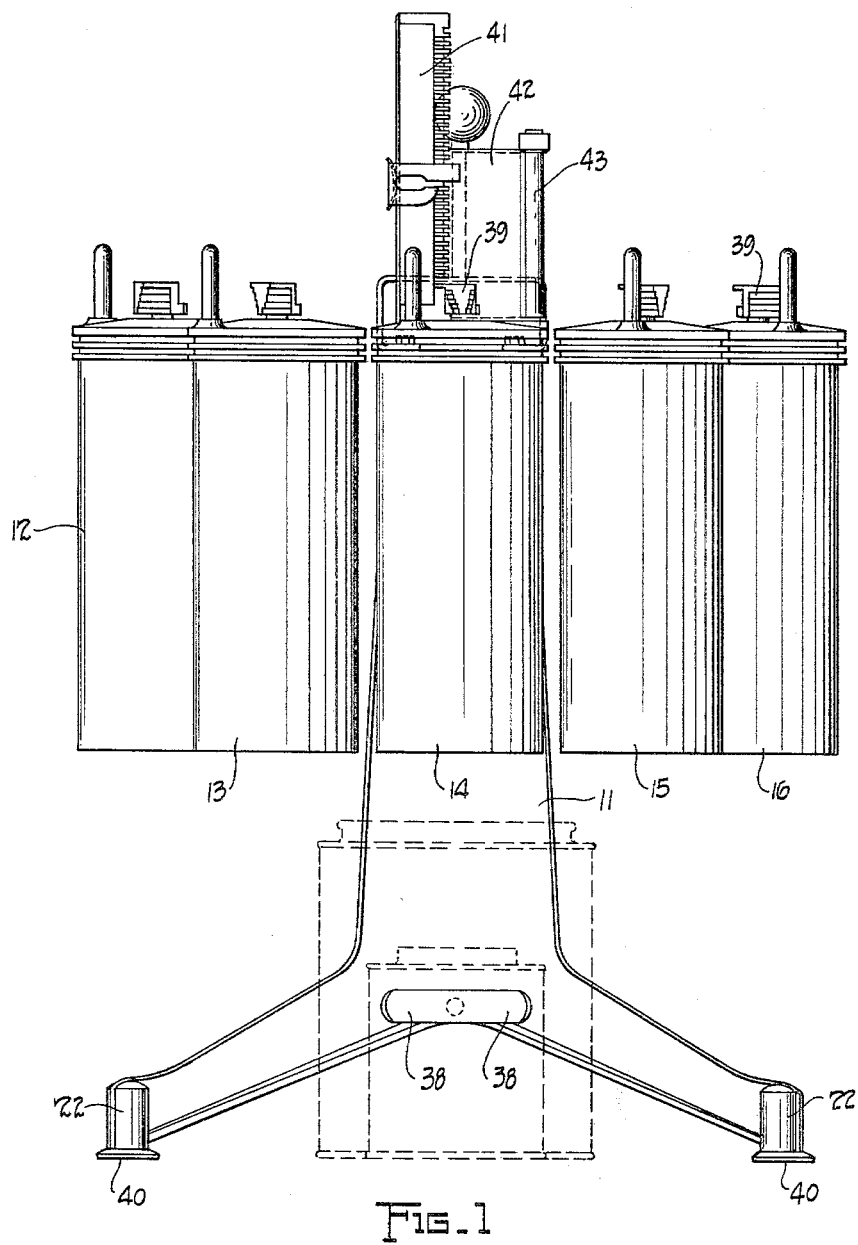
FIG. 1 is an elevation of an embodiment of the invention.

As shown in FIG. 1, the apparatus comprises a standard or support in the form of a pedestal 11 and a battery of liquid receptacles or reservoirs 12 to 21 for colorant or paint. It will be understood that the invention is not limited to a specified number of liquid receptacles or reservoirs, but preferably there are as many different liquid receptacles as different colors of colorant or paint, or different liquids which are to be dispensed and mixed. The pedestal 11 is provided with a plurality of feet 22 having rubber suction pads 40, there being three feet in the embodiment illustrated.

Figure 2:
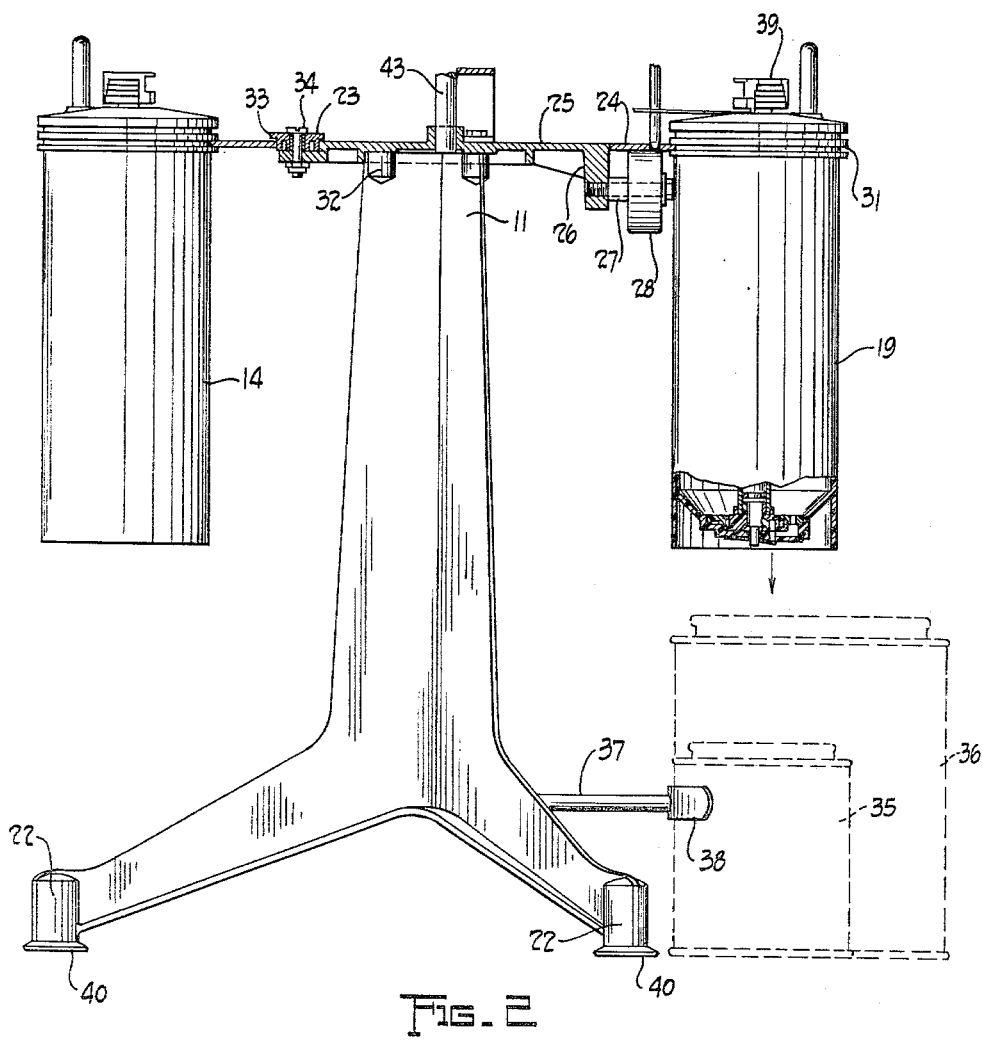
FIG. 2 is an elevation, partially in section and with certain portions broken away, of the apparatus of FIG. 1, as seen from the side.

The battery of paint receptacles 12 to 21 is mounted upon a rotatable carrier 24, as illustrated in FIG. 2. Suitable means are provided for rotatably supporting the carrier 24 at the upper end of the pedestal 11. As illustrated, the mounting comprises a plate or platform 25 secured to the upper end of the pedestal 11 with downwardly extending brackets 26, each carrying a horizontal shaft 27 upon which a roller 28 is rotatably mounted. The carrier 24 is in the form of a plate having a flat surface adapted to ride upon the rollers 28. There are projections 29 extending radially from the carrier and serving to form forks engaging peripheral grooves 31 in the receptacles 12 to 21 for removably supporting them.

The pedestal 11 is shown in the form of a ribbed structure and the platform 25 is formed with bifurcated lugs 32 below which embrace and may be secured to the ribs of the pedestal 11 in a suitable manner, as by screws 30.

Suitable means are provided for holding the carrier 24 down on the rollers 28. In the embodiment illustrated, this takes the form of a plurality of flanged bushings 23 with flanges 33 overhanging the inner edge of the carrier 24. The bushings 23 are bolted in suitable circular recesses in the platform 25 by means of machine screws 34.

Suitable means are provided for locating a container below the station at which the liquid receptacles are intended to dispense a portion of their contents to such a container 35 or 36. As illustrated, an arm 37 extending radially from the lower portion of the pedestal 11 between two of the feet 22 is secured to the pedestal 11 and provided with a pair of fingers 38 against which the paint can or liquid container which is to be filled may be placed. Thus, the container is located in a definite angular position with respect to the pedestal or support 11, whether it be a relatively small can 35 or a larger can 36.

In order that a predetermined amount of each different liquid or each color of paint may be deposited in the container 35 or 36, each of the paint receptacles or liquid reservoirs 12 to 21 is provided with a metering mechanism having an index 39 co-operating with a scale 41. The arrangement is such that when the receptacle is in the position at which it is designed to permit discharge of the measured quantity of liquid into the container 35 or 36, the index 39 of that receptacle is in alignment with the scale 41 which is mounted in a fixed position on the stationary platform 25. The scale 41 is secured to a frame 42 by means of which it is pivotally mounted upon an upright post 43 in order that the scale 41 may be brought into juxtaposition with one of the indexes 39 when the corresponding liquid receptacle is in the discharge station.

Figure 4:
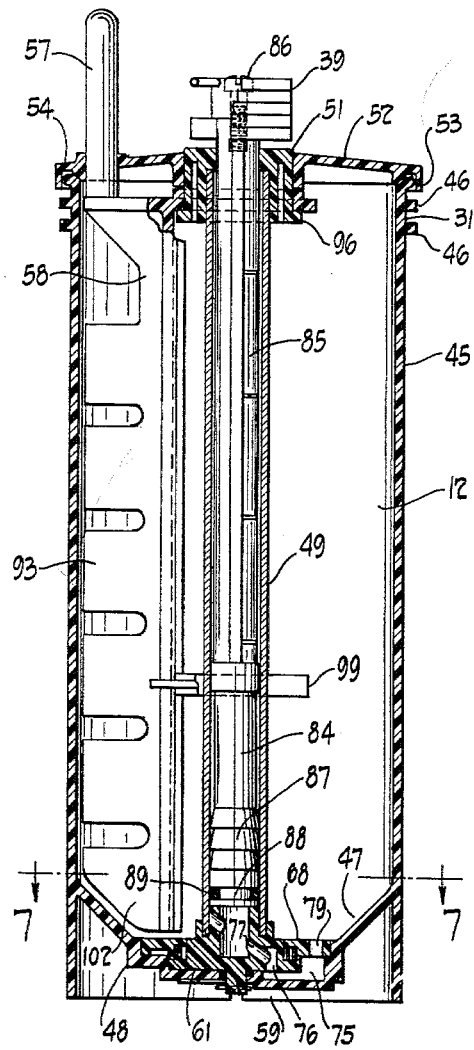
FIG. 4 is a view of a longitudinal section of one of the paint reservoirs of the apparatus of FIG. 1, represented as cut by a vertical plane.

The internal construction of the liquid receptacles is the same and it will be understood from FIG. 4, illustrating a cross-section of one of the receptacles 12. The receptacle 12 comprises a cylindrical outer wall 45 formed with annular rims 46 to provide the annular groove 31 and formed with an inner sloping wall 47 with a tank bottom 48. The tank bottom 48 is formed with suitable cavities and passageways to provide a valve body as will be explained more in detail hereinafter.

There is a center structure comprising a tube 49 composed of suitable material such as brass, stainless steel, or the like rotatably supported at the lower end in the bottom portion 48 of the receptacle 12 and having a locating cap 51 secured to the upper end thereof. There is a cover 52, which is also rotatable, formed with an annular groove 53 forming a slide fit with the top edge 54 of the cylindrical wall 45. The cover 52 is formed also with a concentric center opening 55 forming a loose fit with the locating circular cap 51 of the receptacle center structure 49 so that the cap 51 is rotatable within the cover 52 as well as permitting the cover 52 to be rotatable when the cap 51 is stationary. An eccentric opening 56 is also formed in the cover 52 for receiving the handle 57 of a removable stirrer 58.

In order to form a valve 59 and provide a rotatable lower end support for the tube 49, a rotatable gate valve member 61 is provided, into which the tube 49 is fitted.

To receive the valve member 61 the valve body 48 in the bottom of the receptacle 12 is formed with a socket 62 having two levels with shoulders 63 and 64. The valve member 61 is formed with portions of different diameters 65, 66 and 67. The maximum diameter portion 65 fits within the shoulder 64 of the valve body socket 62. For holding the valve member 61 in place axially and limiting its rotary motion, a flat ring-shaped member 68 is provided, the outer diameter of which fits within the shoulder 63 and the inner diameter of which fits the portion 66 of the valve member 61. The plate 68 is formed also with an arcuate notch 69 co-operating with a narrow radial projection 71 formed in the valve member 61. Arcuately spaced threaded openings 72 are provided in the plate 68 to permit it to be fastened in the socket 62 within the shoulder 63 by means of screws 73 received in arcuately spaced openings 74 in the valve body or bottom portion 48 of the receptacle 12.

A radial passageway 75 is formed in the valve body 48. The passageway 75 extends radially inward sufficiently to co-operate with an opening or port 76 formed in the lower surface of the portion 65 of the valve member 61 communicating through a passageway 77 with the interior 78 of the valve member 61. The radial passageway 75 also extends outwardly sufficiently to co-operate with an opening 79 formed in the plate member 68 and which serves as an outlet into the passageway 75 from the interior of the receptacle 12. The opening 76 in the valve member 61 serves as an inlet from the passageway 75 for one valve position.

An outlet port 81 is formed in the bottom 48 of the receptacle 12 in the proper position to register with the port 76 in the valve member 61 when the valve member 61 is in the appropriate angular position. Preferably, an annular socket surrounding the port 81 is provided to receive an annular packing ring 82. In order to prevent drip from the port 81 a leaf-spring type of check valve 83 is provided.

Suitable means are provided for drawing paint from the receptacle 12 through the port 79, the passageway 75, the port 76 and the passageway 77 into the interior 78 of the member 61 and into the interior of the tube 49 for metering the quantity of paint to be discharged, and thereafter closing the connection between the port 76 and the passageway 75 by rotating the member 61 and expelling the paint from the interior of the tube 49 through the passageway 77, port 76 and outlet port 81. In the arrangement illustrated this is accomplished by means of a piston 84 fitted within the tube 49 and connected by a piston rod 85 to the index member 39.

The piston rod 85 is hollow to receive a machine screw 86 for securing the index member 39 to the upper end of the piston rod 85. Preferably, the piston 84 is formed with skirted portions 87 and is provided with an annular groove 88 to receive a packing ring, such as an O-ring or the like, 89 in order to guard against leakage and permit accurate metering to be accomplished by graduating the extent of withdrawal of the piston rod 85 and the index 39.

Figure 12:
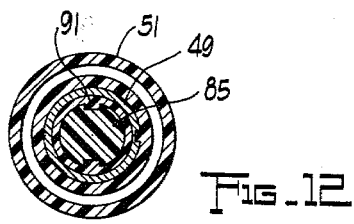
FIG. 12 is a cross-section of the cap locating the pump piston rod employed in the apparatus.

As shown in FIG. 12, the piston rod 85 is formed with a longitudinal groove 91 co-operating with a corresponding indentation in the opening in the cap member 51 so that the valve member 61 may be rotated by rotation of the piston rod 85 through rotation of the index 39, the tube 49 being secured to the rotatable head 51 at the upper end and to the valve member 61 at the lower end.

Figure 6:
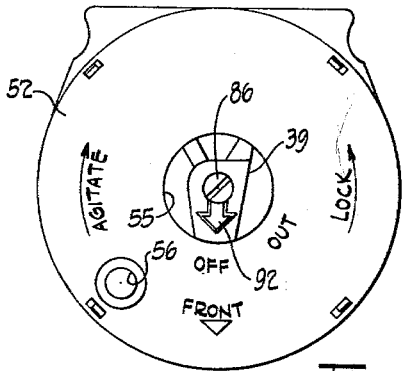
FIG. 6 is a plan view of the apparatus of FIG. 4.

The index member 39 is formed with an arrow or other index 92, on the top surface co-operating with indicia such as "off" and "out" impressed in the top surface of the cover 52, as shown in FIG. 6. Consequently, the angular position of the index member 39 provides an indication as to whether the valve member 61 is in position for metering the quantity of paint or for discharging it through the outlet port 81. The arrangement is such that the index member 39 must be turned to the "off" position, that is, the position in which the outlet port 81 is closed in order to register with the scale 41 and permit measuring the amount of paint drawn into the tube 49 by lifting the index member 39.

When the requisite amount of paint has been drawn in according to the calibrated scale 41 the index member 39 is first turned to the "out" position and then pushed down again so as to expel the metered quantity of paint through the outlet port 81 into the paint container or can 35 or 36 which has been placed below the metering station against the locating fingers 38, shown in FIG. 2.

Figure 8:
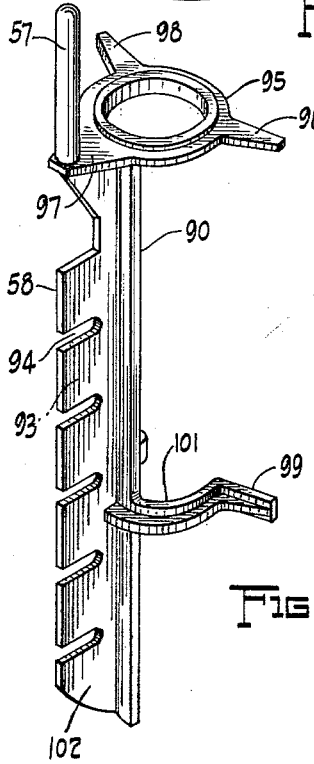
FIG. 8 is a perspective view of a paint stirrer mounted in the apparatus of FIG. 4.

As shown in FIGS. 4 and 8, the stirrer 58 comprises a plurality of vanes 93, preferably separated by grooves or slots 94 and lying along a plane extending radially from a rib member 90 spaced from the center structure tube 49. At the upper end of the rib 90, a hub 95 is provided which is adapted to fit loosely around the lower portion of the cap member 51 and to rest upon a collar 96 formed on the cap portion 51.

The handle 57 is secured to or formed as a part of a radial extension 97 of the hub 95. The radial extension 97 makes a loose fit with the inner surface of the cylindrical wall 45. Likewise, two or more other radially extending members 98 are formed on the hub 95 which also make a loose fit at their ends with the inner surface of the cylindrical wall 45. Consequently, the upper end of the stirrer 58 is located within the cylindrical wall 45 when the apparatus is assembled before the cover 52, which is removable, has been put in place.

The vanes 93 are spaced sufficiently from the inner surface of the cylindrical wall 45 to clear the wall and co-operate with additional radially extending arms 99 for locating the lower end of the stirrer 58 within the receptacle 12 so as to maintain its axis of rotation about the tube 49 when the handle 57 is revolved. The radial projections 99 are secured to arcuate segments 101 formed on the stirrer rib 90, as shown in FIG. 8. It will be understood that prior to metering a quantity of paint to be discharged into one of the containers 35 or 36, the paint in the reservoir is agitated by rotating the handle 57. Since the vanes 93 extend the entire length of the receptacle 12 and the lowermost vane 102 is preferably shaped to fit the sloping portion 47 at the lower end of the receptacle 12, sedimentation of the paint is avoided and the entire quantity of liquid in the receptacle 12 is agitated by rotation of the handle 57. The notches or slots 94 permit counterflow of the liquid as the handle 57 is revolved, thereby assisting in the mixing and agitation of the liquid.

The paint reservoirs 12 to 21 or any one of them may, if desired, be used individually apart from the rotatable support upon the standard 11, since they are readily attachable and detachable. The convenience in attaching and detaching paint reservoirs is advantageous also in permitting replacement of a reservoir containing one color or type of paint with one containing another, all the reservoirs being interchangeable.

The apparatus is relatively inexpensive and is suitable for use in small paint outlets where larger, more expensive and more complicated and cumbersome dispensing machines would not be practical. In a small paint outlet, preparatory to making up a batch of colorant in a container such as the container 36, to produce a paint of particular nonstandard desired shade or hue, reservoirs 12 to 21 are mounted in position on the rotatable carrier 24. For example, if an oil paint is desired, reservoirs containing oil paints of different colors are used.

From the specifications for the desired hue or shade of paint, it is determined how much paint of each different color will be required in a mixture to produce the desired shade or hue. The carrier 24 is then rotated to bring into position one of the paint reservoirs containing paint of the color called for in the specification. With this reservoir, for example, the reservoir 19 in position over the container 36 as shown in FIG. 2, the index 39, while turned to the "off" position as shown in FIG. 6 is pulled upward from the position shown in FIG. 4 until the index 39 has risen to the position on the scale 41 (FIG. 1) measuring the amount of that colorant required. If desired, a preset increment scale stop 103 may be employed for accurately locating the upper position of the index 39. This action draws a metered quantity of paint from the reservoir 19 through passageway 79, 75, 76 and 77 into the interior 78 of the valve member 61 and the tube 49.

Figure 5:
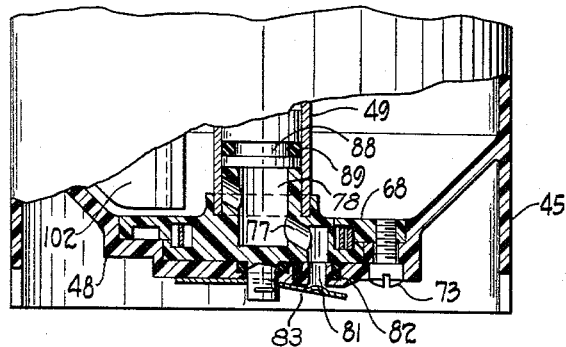
FIG. 5 is a fragmentary view, partially in section, of the lower portion of the apparatus of FIG. 4, as seen from the side.
Figure 10:
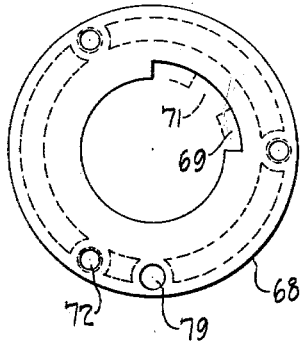
FIG. 10 is a view of a valve locating insert for the reservoir of FIG. 9.
Figure 9:
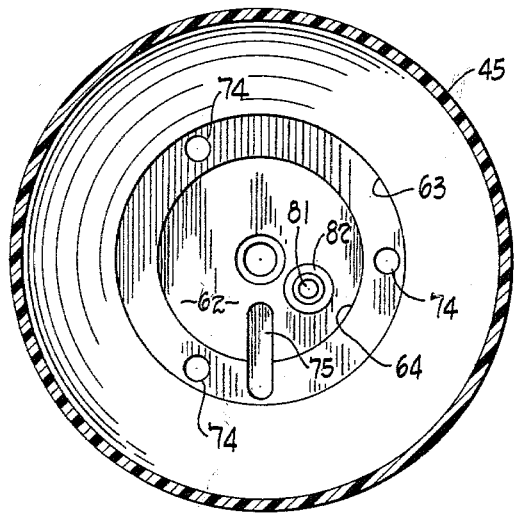
FIG. 9 is a view of a cross-section of the reservoir of FIG. 4, corresponding to FIG. 7, but with parts removed therefrom.
Figure 11:
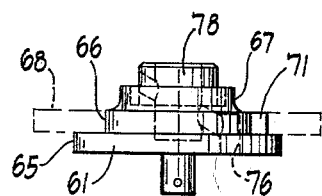
FIG. 11 is an elevation of the valve member mounted in the reservoir.

The index 39 is then rotated counter-clockwise to the "out" position, closing communication through the passageways 75 and 76, but opening communication between the passageway 76 and the outlet port 81 as shown in FIG. 5. The index 39 is then pushed downward to the limit of its motion. A measured quantity of paint is thereby expelled from the interior of the tube 49 through passageways 77 and 76 and the orifice 81 into the container 36. The check valve 83 deflects momentarily to permit the paint to be expelled, and thereafter reseats to prevent any dripping. Thereupon the index 39 is turned back to the "off" position.

The foregoing procedure is repeated for the paint reservoir containing each additional color called for in the specification to produce the desired hue or shade in the container 36.

Prior to each operation of drawing paint into the tube 49, the paint is stirred by rotating the stirrer 58 using the handle 59. It will be observed that the entire assembly for each reservoir is coaxial with the stirrer 58 revolving about the tube 49 serving as a pump housing. The metering pump, in turn, is concentric with the reservoir and concealed therein.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

What is claimed is:

1. A paint dispensing machine comprising in combination:
    (a) a carrier rotatably mounted on a support;
    (b) an adjustable paint metering scale mounted on said support;
    (c) a plurality of paint receptacles circumferentially spaced around and removably secured to the periphery of said carrier, each of said receptacles defining a paint reservoir;
    (d) a coaxially disposed cylinder rotatably mounted in each of said paint reservoirs and longitudinally coextensive therewith, each of said cylinders including;
    (e) a piston longitudinally slidable in said cylinder and having;
    (f) a piston rod projecting therefrom;
    (g) means coacting between said piston and said cylinder for rotating said cylinder with said piston about its longitudinal axis;
    (h) index means secured at the projecting extremity of each of said piston rods for coaction with said adjustable scale;
    (i) a discharge port in the bottom of each of said paint receptacles;
    (j) valve means secured adjacent the bottom of each of said receptacles and selectively coacting between the interior of said paint reservoir, the interior of said cylinder, and said discharge port for selectively admitting paint into the interior of said cylinder from said paint reservoir, and selectively directing the flow of paint through said discharge port;
    (k) means coacting between said cylinder and said valve for operating said valve; and
    (l) positioning means secured to said support, said positioning means adapted to position containers below said receptacles in paint receiving relation.

2. A paint dispensing machine in accordance with claim 1 wherein:
    (a) said index means (h) coact with said adjustable scale to meter into said cylinder a required quantity of paint to be discharged from said cylinder into said container;
    (b) said valve means (j) includes:
        (i) a valve base integral with said receptacle and adapted to seal the lower extremity of said receptacle, said base having a discharge port and an axially extending recess,
        (ii) a valve collar removably secured to said valve base, and adapted to rotatably secure a valve body to said base, said collar having an outlet port communicating with said reservoir and said axial recess,
        (iii) a valve body comprising concentric annular ring portions of different diameters forming a stepped surface, and adapted to be rotatably seated in said valve base, said body having a pair of passageways angularly disposed to each other, said passageways communicating with said cylinder, said axial recess, and said outlet port of said reservoir when said valve body is in one position, and said passageways communicating with said cylinder and said discharge port when said valve body is rotated to a second position; and
    (c) said paint reservoir includes paint stirring means independently rotatably about said cylinder, and means for rotating said stirrer independently of said cylinder, said stirring means comprising:
        (i) a collar rotatable about said cylinder;
        (ii) spacing means coacting between said collar and the inner walls of said paint receptacle for locating said stirring means within said receptacle; and
        (iii) at least one stirrer blade concentrically disposed with respect to said cylinder and longitudinally depending from said collar.

3. A paint dispenser comprising in combination:
    (a) a paint receptacle defining a paint reservoir;
    (b) a coaxially disposed cylinder rotatably mounted in said paint reservoir, and longitudinally coextensive therewith, said cylinder including;
    (c) a piston longitudinally slidable in said cylinder and having;
    (d) a piston rod projecting therefrom;

(e) means coacting between said piston in said cylinder for rotating said cylinder with said piston about its longitudinal axis;
(f) a discharge port in the bottom of said paint receptacle;
(g) valve means secured adjacent the bottom of said receptacle and selectively coacting between the interior of said paint reservoir, the interior of said cylinder, and said discharge port for selectively admitting paint into the interior of said cylinder from said paint reservoir, and selectively directing the flow of paint through said discharge port; and
(h) means coacting between said cylinder and said valve for operating said valve.

4. A paint dispenser in accordance with claim 3, including paint stirring means in said paint reservoir independently rotatable about said cylinder, and means for rotating said stirrer independently of said cylinder.

5. A paint dispenser in accordance with claim 4 wherein the paint stirring means comprises:
(a) a collar rotatable about said cylinder;
(b) spacing means coacting between said collar and the inner walls of said paint receptacle for locating said stirring means within said receptacle; and
(c) at least one stirrer blade concentrically disposed with respect to said cylinder and longitudinally depending from said collar.

6. A paint dispenser in accordance with claim 3 wherein said valve means includes:
(a) a valve base integral with said receptacle and adapted to seal the lower extremity of said receptacle, said base having a discharge port and an axially extending recess;
(b) a valve collar removably secured to said valve base and adapted to rotatably secure a valve body to said base, said collar having an outlet port communicating with said reservoir and said axial recess;
(c) a valve body comprising concentric annular ring portions of different diameters and adapted to be rotatably seated in said valve base, said body having a pair of passageways angularly disposed to each other, said passageways communicating with said cylinder, said axial recess, and said outlet port when said valve body is in one position, and said passageways communicating with said cylinder and said discharge port when said valve body is rotated to a second position.

7. A paint dispenser in accordance with claim 1 wherein said index means coacts with said adjustable scale to meter into said cylinder a required quantity of paint to be discharged into said container, and said dispenser includes paint stirring means comprising:
(a) a collar rotatable about said cylinder;
(b) spacing means coacting between said collar and the inner walls of said paint receptacle for locating said stirring means within said receptacle; and
(c) at least one stirrer blade concentrically disposed with respect to said cylinder and longitudinally depending from said collar.

8. In a paint dispenser having a paint reservoir and a metering cylinder, a paint discharge controlling valve comprising in combination:
(a) a valve base having a discharge port and an axially extending recess;
(b) a valve collar adapted to be removably secured to said valve base, said collar adapted to rotatably secure a valve body to said base, and said collar having an outlet port communicating with said reservoir and said axial recess; and
(c) a valve body comprising concentric annular ring portions of different diameters forming a stepped surface, said body adapted to be rotatably seated in said valve base, said body having a pair of passageways angularly disposed to each other, said passageways communicating with said cylinder, said axial recess, and said outlet port when said valve body is in one position, and said passageways communicating with said cylinder and said discharge port when said valve body is rotated to a second position.

References Cited by the Examiner
UNITED STATES PATENTS

| | | | |
|---|---|---|---|
| 2,040,638 | 5/36 | Beck | 222—494 X |
| 2,975,939 | 3/61 | Russell et al. | 222—144 X |
| 2,985,339 | 5/61 | Fischer et al. | |
| 3,015,415 | 1/62 | March et al. | 222—144 X |
| 3,052,376 | 9/62 | Fogg | 222—309 X |
| 3,064,864 | 11/62 | O'Neill | 222—309 X |
| 3,066,830 | 12/62 | Heiss et al. | 222—144.5 X |
| 3,074,597 | 1/63 | Felts | 222—144 X |

RAPHAEL M. LUPO, *Primary Examiner.*
LOUIS J. DEMBO, *Examiner.*